UNITED STATES PATENT OFFICE.

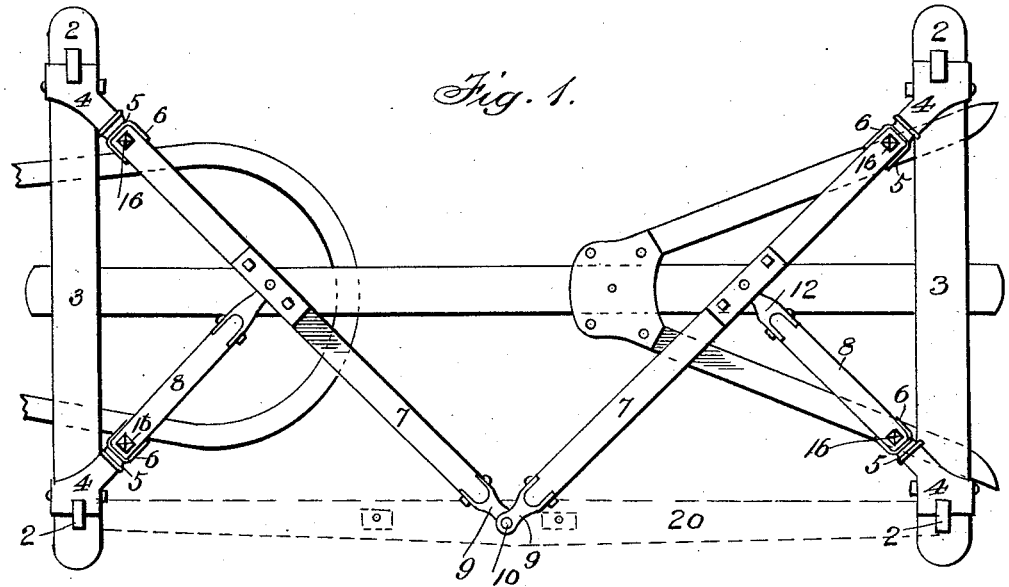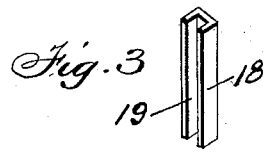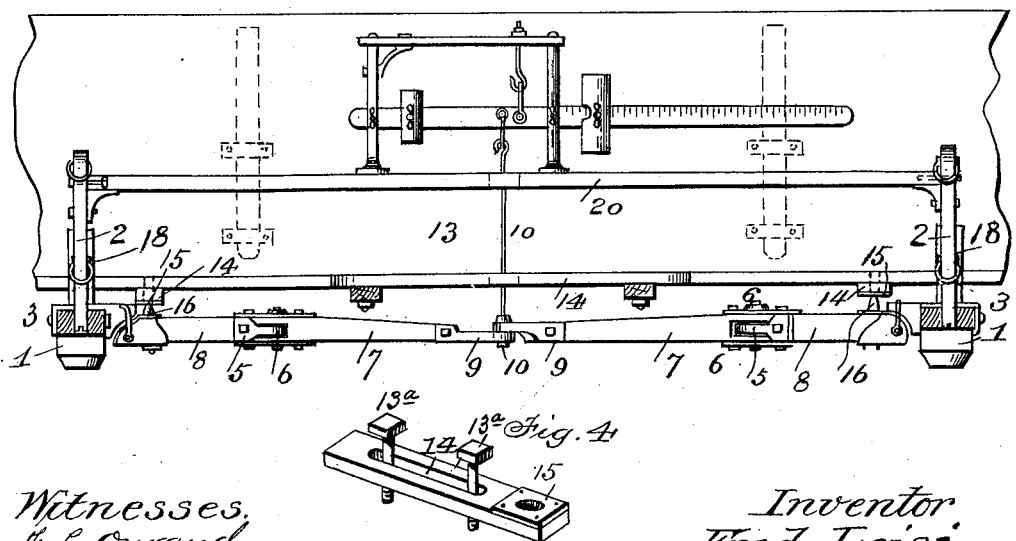

FRED LEISI, OF MOUNT VERNON, MISSOURI.

WEIGHING-SCALE.

SPECIFICATION forming part of Letters Patent No. 567,483, dated September 8, 1896.

Application filed May 18, 1896. Serial No. 591,985. (No model.)

*To all whom it may concern:*

Be it known that I, FRED LEISI, a citizen of the United States, and a resident of Mount Vernon, in the county of Lawrence and State of Missouri, have invented certain new and useful Improvements in Weighing-Scales; and I do hereby declare that the following is a full, clear, and exact description of the invention, which will enable others skilled in the art to which it appertains to make and use the same, reference being had to the accompanying drawings, which form a part of this specification.

My invention relates to improvements in weighing wagons and other vehicles of that class or description in which a weighing mechanism is attached thereto, whereby the contents of the wagon may be readily and accurately weighed without removal therefrom, or without running the wagon onto a platform-scale, as is usually the practice.

The object of the invention is to provide an improved construction of the same which shall possess superior advantages with respect to efficiency in use.

The invention consists in the novel construction and combination of parts hereinafter fully described and claimed.

In the accompanying drawings, Figure 1 is a plan view of the running-gear of an ordinary farm-wagon, showing part of the weighing mechanism in section. Fig. 2 is a side elevation, partly in section. Figs. 3 and 4 are detail views.

In the said drawings the reference-numeral 1 designates the wagon-bolsters, which may be of any ordinary or suitable construction, and 2 the standards secured thereto. Resting on said bolsters are beams 3, the ends of which are formed with rectangular slots, with which the standards engage, and which hold the beams in place.

The numeral 4 designates castings, which are gained into and bolted to said beams and provided at their free ends with holes or aperatures in which are journaled yokes or clevices 5, the ends of which are pivotally connected with sockets 6, bolted to the outer ends of long and short diagonal bars 7 and 8. The long bars 7 extend from the beams at one side of the wagon diagonally across the same, meeting at the center of the other side, where they are provided with sockets 9, pivotally connected by means of a vertical rod 10. At or about their centers the bars 7 are provided with sockets 12, to which the inner ends of bars 8 are pivoted.

The numeral 13 designates the wagon-body, provided near each end on the under side with transverse wooden bars 14, to which are bolted bearing-pieces 15, the under sides of which are slightly concave, to receive the rounded points of pins 16, passing through the ends of the bars 7 and 8, and which form the bearings for the wagon-body when the weighing mechanism is in use. The bolts $13^a$, (see Fig. 4 and dotted lines, Fig. 2,) which secure the plates 15 in place, pass through elongated slots therein, so that said plates may be moved transversely out of contact with the said pins when the weighing mechanism is not in use, so that the wagon-body will rest upon the beams 3.

Located between the standards and the sides of the wagon-body are removable slides 18, formed on their outer sides with grooves 19, which engage with the standards. These slides are removed during the weighing operation, so as to give the wagon-body free play.

The numeral 20 designates a horizontal bar secured to the upper ends of the standards 2 at one side of the wagon, upon which is mounted a weighing-scale of any ordinary or suitable construction, to the scale-beam of which the rod 10 is connected.

The operation will be readily understood. When the wagon is to be used as a weighing-wagon, the body will rest upon the rounded points of the pins 16, the slides 18 being removed. The weight of the wagon-body and its load will depress the bars 7 and 8, and the aggregate weight will be indicated by the scale-beam, and by substracting the weight of the wagon-body therefrom, which is known, the net weight of the contents of the wagon can be determined.

When not used for weighing, plates 15 are slid back, so as to allow the wagon-body to rest on the beams 3, and the slides 18 are interposed between the sides of the body and the standards, which will prevent the body from wabbling.

My invention will be found very useful in weighing grain and other produce or articles or objects in bulk, and will effect a great saving in time and expense over the ordinary methods.

The weighing mechanism can be removed from the wagon and be used as a stationary platform-scale if desired.

Having thus fully described my invention, what I claim is—

1. In a weighing-wagon, the combination with the bolsters, the standards, the beams mounted thereon, having rectangular slots in the ends with which said standards engage, and the castings located in said beams, the clevises pivotally connected with said castings, the long and short diagonal bars pivotally connected together, and to the clevises, the pins carried by said bars, the horizontal bar secured to the standards and the weighing-scale mounted thereon and connected with said long bars, of the wagon-body, the transverse bars secured to the under side thereof, having recesses near each end, the slotted movable plates concaved on the under sides, and the bolts for securing said plates to the transverse bars; substantially as described.

2. In a weighing-wagon of the character described, the combination with the bolsters, the standards, the beams, the long and short diagonal bars, and the weighing-scale, of the wagon-body and the removable grooved slides interposed between the sides of the wagon-body and the standards, and the latter engaging with said grooves; substantially as described.

3. In a weighing-wagon of the character described, the combination with the bolsters, the standards, the beams, the long and short diagonal bars, the bearing-pins connected therewith, and the weighing-scale connected with said long bars, of the wagon-body, the transverse bars secured to the under side thereof having recesses near each end, the adjustable slotted plates connected with said bars, concaved on their under sides, the securing-bolts and the removable grooved slides interposed between the sides of the wagon-body and the standards; substantially as described.

In testimony that I claim the foregoing as my own I have hereunto affixed my signature in presence of two witnesses.

FRED LEISI.

Witnesses:
JOHN C. TURK,
WILLIAM A. CONNEL.